United States Patent
Schwarzkopf

(10) Patent No.: US 6,222,165 B1
(45) Date of Patent: Apr. 24, 2001

(54) ELECTRICAL SLEEVE HEATER

(75) Inventor: Eugen Schwarzkopf, Lüdenscheid (DE)

(73) Assignee: Hotset Heizpatronen U. Zubehor GmbH, Ludenscheid (DE)

( * ) Notice: Subject to any disclaimer, the term of this patent is extended or adjusted under 35 U.S.C. 154(b) by 0 days.

(21) Appl. No.: 09/565,525

(22) Filed: May 5, 2000

(30) Foreign Application Priority Data

May 6, 1999 (DE) .............................. 199 20 825

(51) Int. Cl.[7] ....................................... H05B 3/58
(52) U.S. Cl. ........................ 219/535; 219/468.2; 219/544
(58) Field of Search .................. 219/453.11, 453.12, 219/453.13, 468.2, 520, 523, 538, 542, 544

(56) References Cited

U.S. PATENT DOCUMENTS

| | | | |
|---|---|---|---|
| 3,475,597 | * 10/1969 | Desloge | 219/544 |
| 4,558,210 | * 12/1985 | Leary | 219/535 |
| 5,844,210 | * 12/1998 | Dowdle | 219/523 |
| 5,916,468 | * 6/1999 | Akiyama et al. | 219/544 |
| 6,054,691 | * 4/2000 | McGwire | 219/535 |

* cited by examiner

Primary Examiner—Tu Ba Hoang
(74) Attorney, Agent, or Firm—Herbert Dubno; Andrew Wilford

(57) ABSTRACT

A sleeve heater is made by first cutting in one face of a flat metal plate a continuous groove and then fitting to the groove a heater wire with at least one end of the wire projecting past an edge of the plate. The plate is then plastically deformed with the wire to a tubular shape centered on an axis with the one face directed radially inward. The installation on a body to be heated is completed by fitting the deformed plate over the body to be heated and tightening the plate on the body to grip it snugly. The plate is formed of a heat-conducting metal, for instance brass, copper, or aluminum. The face of the plate from which the wire projects is directed radially inward so the wire directly engages the body. The tightener, which can be a band that circumferentially surrounds the sleeve or fittings provided at edges of the sleeve, bridges edges of the plate.

12 Claims, 2 Drawing Sheets

ELECTRICAL SLEEVE HEATER

FIELD OF THE INVENTION

The present invention relates to a tubular heating element. More particularly this invention concerns such sleeve heater that is fitted, for instance, around a nozzle of a plastic or metal extruding machine and a method making such a sleeve heater.

BACKGROUND OF THE INVENTION

In order to maintain an extruder nozzle or the like hot, a sleeve heater is used that basically comprises a tubular body in which is incorporated an electrical heating wire. Such a sleeve heater is typically slipped over the nozzle to be heated so it fits snugly therewith. When the wire is energized, the is nozzle or the like is appropriately heated. Thermostatic sensors can be built into the sleeve heater. In many situations the body being heated is not of perfectly uniform shape so the sleeve heater must be provided with cutouts or irregular formations that allow it to accommodate the contours of the body being heated. Furthermore in some situations specific regions of the body must be heated more or less than other regions, so the spacing of the turns or loops of the heating wire must be appropriately increased or decreased in the parts of the sleeve that will contact these regions.

Such a sleeve heater is typically made by winding the heating wire about a first tube and then fitting a second tube around the outside of this assembly and filling the space between them with heat-conducting potting. Fitting the heating wire to the inner tube is a tricky operation, in particular when nonuniform spacing of the turns is necessary or the wire must be guided around cutouts in the tubes. In general adapting such a system for a particular application is an extremely expensive and time-consuming chore.

OBJECTS OF THE INVENTION

It is therefore an object of the present invention to provide an improved sleeve heater.

Another object is the provision of such an improved sleeve heater which overcomes the above-given disadvantages, that is which is of inexpensive and simple.

A further object is to provide an improved method of making a sleeve heater and mounting it on a body to be heated.

SUMMARY OF THE INVENTION

A sleeve heater is made by first cutting in one face of a flat metal plate a continuous groove and then fitting to the groove a heater wire with at least one end of the wire projecting past an edge of the plate. The plate is then plastically deformed with the wire to a tubular shape centered on an axis with the one face directed radially inward and axially extending edges of the sleeve angularly confronting each other. The installation on a body to be heated is completed by fitting the deformed plate over the body to be heated and tightening the plate on the body to grip it snugly.

The groove can be formed by milling and is of a depth smaller than a diameter of the wire so that same projects from the face of the plate. The path followed by the wire can be exactly tailored to the heat requirements of the body to which the heater is going to be fitted. The groove is wider at its base than at the face of the plate, typically being of dovetail shape. This ensures good contact of the wire with the body being heated and good retention of the wire in the groove.

The plate in accordance with the invention is formed of a heat-conducting metal, for instance brass, copper, or aluminum. In some situations where less heat conduction through the plate, but more directly from the wire to the body, is desired, stain-less steel can be used.

The face of the plate from which the wire projects is directed radially inward so the wire directly engages the body. The tightener can be a band that circumferentially surrounds the sleeve or fittings provided at edges of the sleeve, bridges edges of the plate. A screw or the like which can bridge the axially extending and angularly confronting edges of the split in the sleeve is turned to tighten the sleeve on the body.

In another arrangement according to the invention the plate is formed of two part-cylindrical sections connected together at a hinge. Each plate section is provided with its own such wire. Such a heater can be fitted from the side around the body it is intended to heat.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
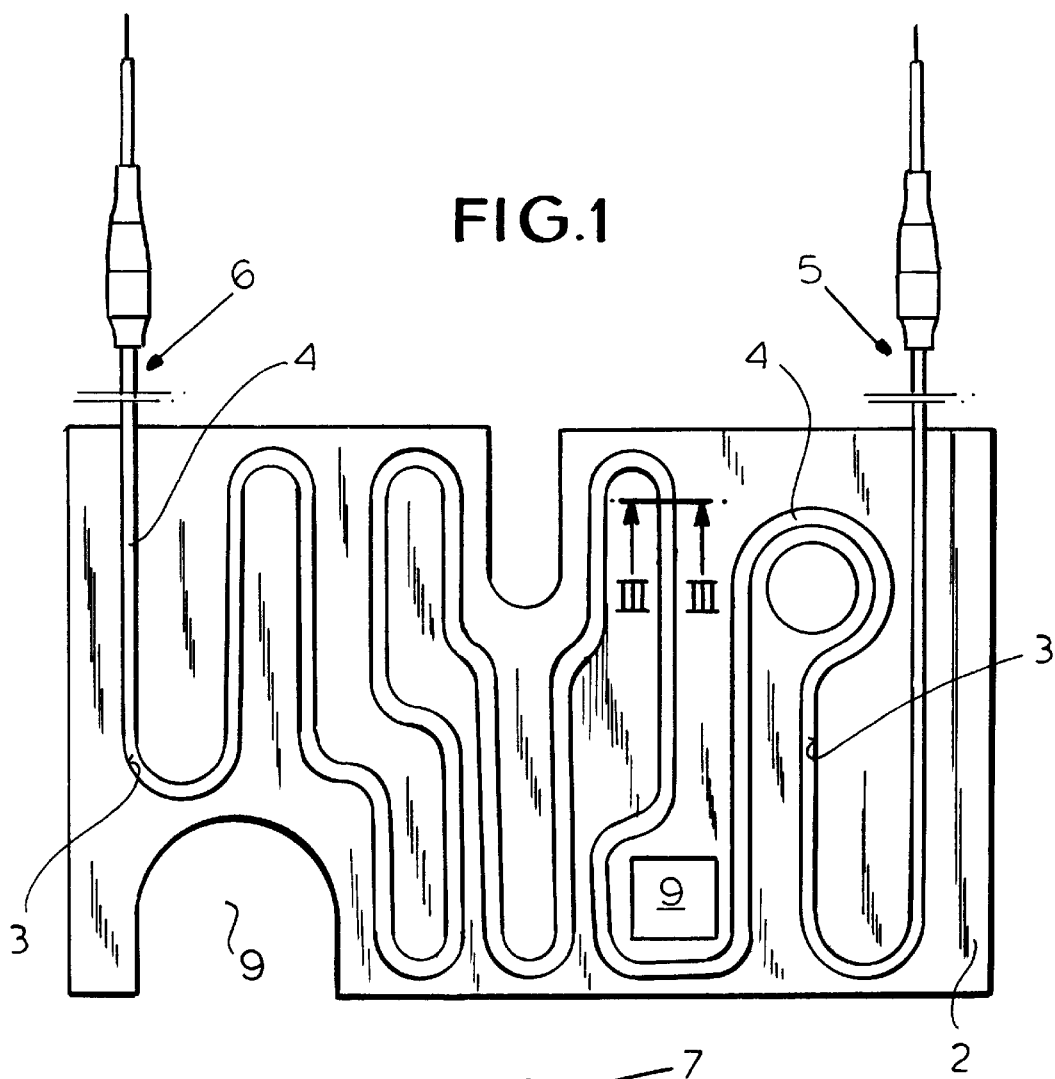
FIG. 1 is a view of the heater according to the invention prior to forming into a tube and mounting on a body to be heated.
Figure 2:
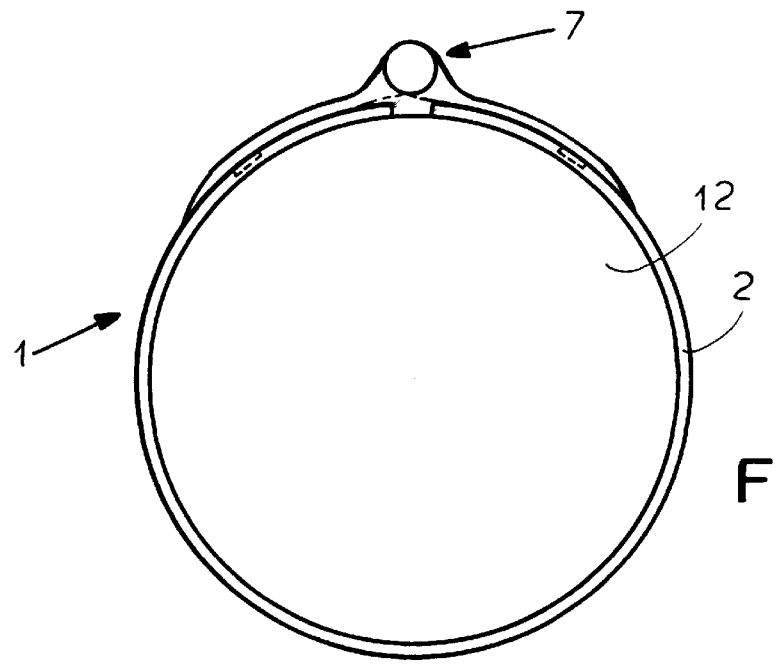
FIG. 2 is an end view of the heater in accordance with the invention mounted on a body to be heated.
Figure 3:
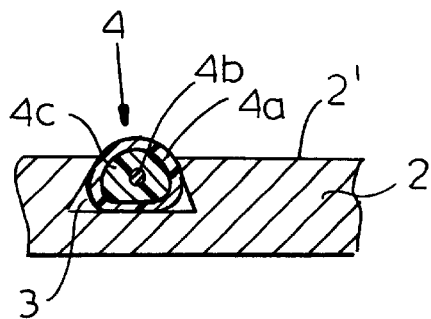
FIG. 3 is a large-scale section taken along line III—III of FIG. 1.

As seen in FIGS. 1, 2, and 3, a sleeve heater 1 according to the invention is basically formed as a malleable metallic plate 2 of brass, aluminum, or copper formed with a plurality of cutouts 9 and having one face into which is cut a meandering groove 3. An electrical heating strand or wire 4 having connector ends 5 and 6 adapted to be connected to a source of electric power is fitted to the groove 3. These connector ends 5 and 6 project from an edge of the plate 2 although it is possible for them to project from a hole in a face of the plate 2 so that in the finished installation they project radially.

FIG. 3 shows how the groove 3 is of dovetail section, that is wider at its base than at the surface 2' of the plate 2 where it opens. The wire 4 is forced into the groove 3 with quite some pressure so that it deforms plastically, widening and locking itself in the groove 3. The wire 4 comprises an outer jacket 4a, a central resistive conductor 4b, and an insulating mass 4c surrounding the conductor 4c. The wire 4 can be round or polygonal in section. The diameter of the wire 4 is greater than the depth of the groove 3 so that when installed it projects past the face 2'.

In use the plate 2, formed as described below into a tube or sleeve, is fitted around a body 12 and edges of the plate 2 are secured together by a clamp 7 to engage the face 2' snugly with the outer surface of the body 12.

Figure 4:
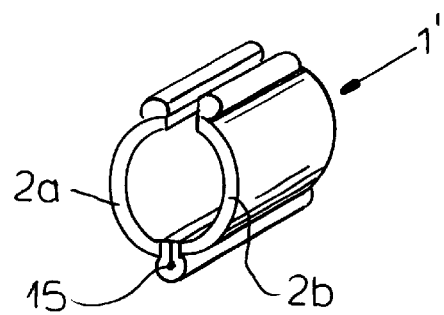
FIG. 4 is an end perspective view of another heater sleeve in accordance with the invention.

In FIG. 4 a pair of semicylindrical plates 2a and 2b each fitted with a respective wire 4 are fitted together along one edge at a hinge 15 and are provided with clamps 7 along their opposite edges. Such a system is not installed by being slipped axially over an end of the body 12 like the system of FIGS. 1 and 2, but instead can be mounted from the side.

Figure 5A:
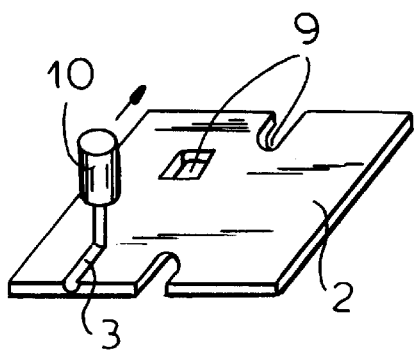
FIGS. 5A through 5D schematically illustrate manufacture of the sleeve heater according to the invention.

As shown in FIG. 5A such a heater sleeve 1 is formed by first cutting the groove 3 into the face 2' of the plate 2 when it is in a planar or flat shape by means of a tool such as the milling device indicated at 10. This tool 10 moves along a path corresponding to the exact shape needed for the groove 3.

Figure 5B:
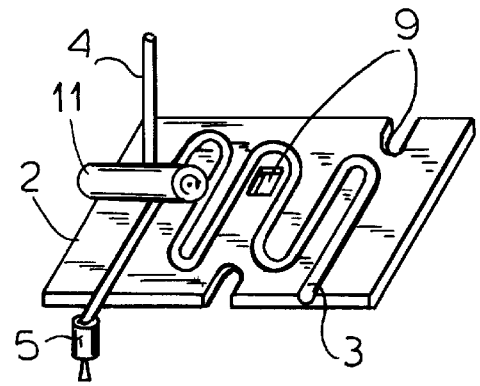

Then as shown in FIG. 5B the wire or strand 4 is fitted to the groove 3, normally by pressing it down into the groove 3 with a roller 11. The result is a flat plate 2 with the heating wire 4 solidly fitted to it. When installed, the wire 4 projects past the surface 2'.

Figure 5C:
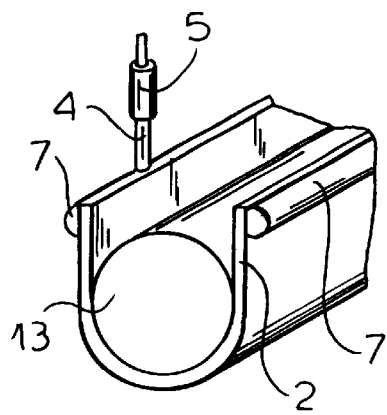

The flat plate 2 is then bent around a roller or mandrel 13 to impart to it the desired tubular shape as shown in FIG. 5C.

Figure 5D:
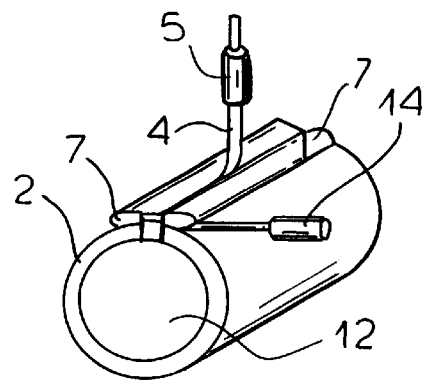

Finally as shown in FIG. 5D, a screwdriver 14 or the like is used to turn a screw between the fittings 7 and thereby tighten the heater 1 on the body 12 so it engages it snugly. Since the wire 4 projects past the surface 2', good contact between it and the outer surface of the body 12 is ensured.

I claim:

1. A method of making a sleeve heater and installing it on a body to be heated, the method comprising the steps of sequentially:

cutting in one face of a flat split metal plate a continuous groove;

fitting to the groove a heater wire with at least one end of the wire projecting past an edge of the plate;

plastically deforming the plate with the wire to a tubular shape centered on an axis with the one face directed radially inward;

fitting the deformed plate over the body to be heated; and tightening the plate on the body to grip it snugly.

2. A sleeve heater made in accordance with the method of claim 1.

3. A sleeve heater comprising:

an axially split tubular plate having a face formed with a meandering groove;

an electrical heating wire fitted to the groove and having at least one end projecting past an edge of the plate, whereby electricity can be fed to the wire via the end; and means for tightening the tubular plate on a body to be heated.

4. The sleeve heater defined in claim 3 wherein the plate has a thickness greater than a diameter of the wire.

5. The sleeve heater defined in claim 4 wherein the wire projects out of the groove past the face of the plate.

6. The sleeve heater defined in claim 4 wherein the groove is wider at its base than at the face of the plate.

7. The sleeve heater defined in claim 6 wherein the groove is dovetail shaped.

8. The sleeve heater defined in claim 3 wherein the plate is formed of a heat-conducting metal.

9. The sleeve heater defined in claim 3 wherein the face is directed radially inward.

10. The sleeve heater defined in claim 3 wherein the tightening means bridges edges of the plate.

11. The sleeve heater defined in claim 3 wherein the plate is formed of two part-cylindrical sections connected together at a hinge.

12. The sleeve heater defined in claim 11 wherein each plate section is provided with its own such wire.

* * * * *